Patented Mar. 29, 1927.

1,622,368

UNITED STATES PATENT OFFICE.

HENRI LOUIS JOSEPH CHAVASSIEU, OF IZIEUX, FRANCE, ASSIGNOR TO LA SOCIÉTÉ POUR LA FABRICATION DE LA SOIE RHODIASETA, SIEGE SOCIAL, OF PARIS, FRANCE.

SPINNING PROCESS.

No Drawing. Original application filed March 7, 1925, Serial No. 13,861, and in France January 20, 1925. Divided and this application filed March 26, 1926. Serial No. 97,773.

Certain known works, particularly those of Dubosc, Williams and Cross, have disclosed the property possessed by cellulose and alkali-cellulose of dissolving in sulfocyanide solutions, and it was thought that this property would afford a basis for a process for the manufacture of threads and films. Attempts to carry out this process industrially, however, have not met with success. To maintain the necessary character and fluidity of these solutions, the concentration of salts and the temperature required are such that the cost of the solution and the complicated character of the spinning machinery become prohibitive.

The position is quite different if derivatives of sulfo-cyanic acid or of iso-sulfocyanic acid are used as solvents for the ethers or esters of cellulose, such derivatives being employed either by themselves or in admixture with known solvents for cellulose ethers or esters. When cold, the solutions thus obtained, with a concentration of salts far below saturation, have the same viscosity as solutions ordinarily employed for the manufacture of threads and films, and the standard machinery of the industry can then be used without modification.

For this particular manufacture, the use of sulfo-cyanides and the like has the great advantage over the exclusive use of volatile solvents, that it renders possible coagulation in an aqueous medium and thus allows of a complete recovery of the solvent—an all important factor in the cost price.

It has hitherto been proposed to spin in water solutions of acetyl- or nitro-cellulose obtained with a volatile organic solvent, but in such a case the thread or film, already opaque at the moment of the coagulation, keeps dull in a dry state and then has only very little strength and stability.

This drawback is removed by the use of solutions of cellulose ethers or esters containing a sulfo-cyanic derivative. Coagulated in water, these solutions give a transparent gel which, on being brought to a dry state in the form of threads or films, has the transparency, brilliancy, strength and stability of products obtained by coagulation in hot air.

For special purposes such as the manufacture of plastic masses intended to be moulded, the ordinary plastifying agents for the ethers or esters of cellulose if dissolved in the solvent for such ethers or esters before the introduction of the sulfocyanic derivative, are found again in the finished product with all their properties.

When sulfo-cyanic solutions of cellulose ethers or esters have been prepared for the purpose of manufacturing artificial silk by methods analogous to those employed for solutions of cellulose xanthate, it is sometimes advisable to allow the solutions to ripen before they are converted into threads or films. The desired degree of ripening having been obtained, it can be maintained fixed by slightly alkalizing the solution with ammonia or with an organic base such as aniline or pyridine. In this way provision is made for regulating the viscosity and the speed of coagulation, whereby filaments of any desired degree of fineness can readily be obtained by the spinning process known as "drawing".

By way of example, solutions suitable for the manufacture of threads or films are obtained by using one of the formulae recited below in which the parts are given by weight:

1. Acetone 50, water 15, ammonium sulfocyanide 20, acetyl-cellulose 15.

2. Crystallizable acetic acid 40, water 25, ammonium sulfo-cyanide 20, acetyl-cellulose 15.

3. Water 75, ammonium sulfo-cyanide 25, formyl-cellulose 15.

In the last example the preparation of the solution may be facilitated by a slight acidification, preferably with formic acid.

All these solutions may be coagulated directly in water, with or without the addition of salts. The following compounds can equally well be employed in place of sulfo-cyanide of ammonium:—sulfo-cyanides of potassium, of sodium, of calcium or of zinc; double sulfo-cyanides such as those of ammonium and zinc or of calcium and zinc; these salts being taken separately or in admixture two or more together. Equally suitable are the soluble sulfo-cyanic or iso-sulfo-cyanic ethers, and sulfo-cyanic acid itself in solution in water or alcohol.

The foregoing examples are intended merely to illustrate the most characteristic types of application of the general principle. Similar solutions are obtained with any cellulose esters or ethers capable of being industrially utilized, more particularly nitro-cellulose and ethyl- or methyl-cellulose. For certain purposes it is sometimes advantageous to replace the whole or part of the water of the solvent by alcohol or the like. Several of these ethers or esters can also be dissolved simultaneously, and thus an infinite variety of substances can be obtained with the most different effects.

Substances of non-cellulosic nature can also be introduced into the solution and be recovered in intimate admixture with the cellulose ether or ester after coagulation. For instance, homogeneous viscous solutions are obtained by mixing a sulfo-cyanic solution of casein with a sulfo-cyanic solution of cellulose formate. In the coagulated product, the casein coming from a neutral solution has not been hydrolyzed and still exists without change.

In general, the manner of carrying out the process, which is characterized by its simplicity, is as follows:—

To the aqueous solution of sulfo-cyanide, sometimes alcoholized, the organic solvent is added, agitation is effected until an intimate admixture is obtained, and the cellulose ether or ester is then introduced. The mass is stirred as long as necessary to insure absolute homogeneity, generally for several hours, filtered with all the usual precautions and sent to the spinning or film-manufacturing plant.

The plant does not differ in any way from the types generally employed for cellulose solutions which are coagulated in aqueous media: the only difference consists in the use of water as the coagulant. As in the well known processes of manufacture, the coagulant, in continuous circulation, is constantly renewed by systematically removing some of the exhausted bath and replacing it by an equal quantity of fresh bath, in the present case, of water.

The substances dissolved in the exhausted bath are then recovered, the volatile solvent by distillation and the sulfo-cyanide by concentration. The distillation step can sometimes be omitted. For instance, if the solvent contains acetone, a practical method for the recovery of this substance is to render it insoluble by combination with bisulphite of soda; a simple filtration replaces the distillation.

No claim is made herein for the preparation of the cellulose solution itself, as the preparation of such solution forms the subject matter of my earlier application No. 13,861, filed March 7, 1925, of which the present case is a division.

I claim as my invention:

1. A spinning process, comprising the steps of dissolving a cellulose ether or ester in a solution of a sulfo-cyanic derivative, and coagulating the resultant solution in the form of threads or films.

2. A spinning process, comprising the steps of dissolving a cellulose ether or ester in a solution of a sulfo-cyanic derivative, and coagulating the resultant solution in water in the form of threads or films.

3. A spinning process, comprising the steps of dissolving acetyl-cellulose in a solution of a sulfo-cyanic derivative, and coagulating the resultant solution in an aqueous medium in the form of threads or films.

4. A spinning process, comprising the steps of dissolving a cellulose ether or ester in a solution of ammonium sulfo-cyanide, and coagulating the resultant solution in the form of threads or films.

5. A spinning process, comprising the steps of dissolving a cellulose ether or ester in a solution of ammonium sulfo-cyanide, and coagulating the resultant solution in water in the form of threads or films.

6. A spinning process, comprising the steps of dissolving acetyl-cellulose in a solution of ammonium sulfo-cyanide, and coagulating the resultant solution in the form of threads or films.

7. A spinning process, comprising the steps of intimately mixing an organic solvent with an aqueous solution of sulfo-cyanide, dissolving a cellulose ether or ester in the mixture, stirring and filtering the resultant solution, and coagulating the filtered solution in the form of threads or films.

8. A spinning process comprising the steps of intimately mixing an organic solvent with an aqueous solution of sulfo-cyanide, dissolving a cellulose ether or ester in the mixture, adding to the resultant solution a sulfo-cyanic solution of non-cellulosic material, and coagulating the final solution in the form of threads or films.

9. A spinning process comprising the steps of intimately mixing an organic solvent with an aqueous solution of sulfo-cyanide, dissolving a cellulose ether or ester in the mixture, adding to the resultant solution a sulfo-cyanic solution of casein, and coagulating the final solution in the form of threads or films.

10. A spinning process, comprising the steps of dissolving a cellulose ether or ester in a solution of a sulfo-cyanic derivative, coagulating the resultant solution in water in the form of threads or films, and constantly renewing the coagulating bath.

11. A spinning process, comprising the steps of dissolving a cellulose ether or ester in a solution of a sulfo-cyanic derivative, coagulating the resulant solution in water in the form of threads or films, and systematically removing part of the exhausted coagulating bath and replacing it by an equal quantity of water.

12. A spinning process, comprising the steps of dissolving a cellulose ether or ester in a solution of a sulfo-cyanic derivative, and coagulating the resultant solution in a continuously-circulating water bath in the form of threads or films.

13. A spinning process, comprising the steps of dissolving a cellulose ether or ester in a solution of a sulfo-cyanic derivative, ripening the resultant solution to a predetermined degree, adding to the ripened solution a substance which will maintain it at such degree, and then spinning the ripened solution.

14. A spinning process, comprising the steps of dissolving a cellulose ether or ester in a solution of a sulfo-cyanic derivative, ripening the resultant solution to a predetermined degree, alkalizing the ripened solution to maintain it at such degree, and then spinning the ripened solution.

In testimony whereof I affix my signature.

HENRI LOUIS JOSEPH CHAVASSIEU.